United States Patent
Lee et al.

(10) Patent No.: US 9,476,198 B2
(45) Date of Patent: Oct. 25, 2016

(54) GLASS FIBERBOARD AND PRODUCTION METHOD THEREFOR

(75) Inventors: Myung Lee, Hwaseong-si (KR); Seong-Moon Jung, Daejeon (KR); Suk Jang, Seoul (KR); Eun-Joo Kim, Uiwang-si (KR)

(73) Assignee: LG HAUSYS, LTD., Seoul (KR)

( * ) Notice: Subject to any disclaimer, the term of this patent is extended or adjusted under 35 U.S.C. 154(b) by 332 days.

(21) Appl. No.: 14/112,166

(22) PCT Filed: May 11, 2012

(86) PCT No.: PCT/KR2012/003699
§ 371 (c)(1),
(2), (4) Date: Oct. 16, 2013

(87) PCT Pub. No.: WO2012/154000
PCT Pub. Date: Nov. 15, 2012

(65) Prior Publication Data
US 2014/0034868 A1 Feb. 6, 2014

(30) Foreign Application Priority Data
May 12, 2011 (KR) .................. 10-2011-0044629

(51) Int. Cl.
*E04B 1/78* (2006.01)
*C03C 25/42* (2006.01)
*B29D 99/00* (2010.01)
*C04B 28/00* (2006.01)
*C04B 30/02* (2006.01)
*C04B 14/42* (2006.01)

(52) U.S. Cl.
CPC ............... *E04B 1/78* (2013.01); *B29D 99/001* (2013.01); *C03C 25/42* (2013.01); *C04B 14/42* (2013.01); *C04B 28/005* (2013.01); *C04B 30/02* (2013.01)

(58) Field of Classification Search
None
See application file for complete search history.

(56) References Cited

U.S. PATENT DOCUMENTS

| 4,402,750 A | 9/1983 | Okamura et al. |
| 4,555,394 A | 11/1985 | Asaoka et al. |
| 4,833,025 A | 5/1989 | Rossi |
| 1,929,942 A | 10/1993 | Barclay et al. |
| 5,591,505 A * | 1/1997 | Rusek, Jr. ................ B32B 1/06 428/69 |

FOREIGN PATENT DOCUMENTS

| CN | 1164563 A | 11/1997 |
| CN | 1493758 A | 5/2004 |
| EP | 0363911 B1 | 6/1993 |
| JP | 6391206 A | 4/1988 |

(Continued)

OTHER PUBLICATIONS

Japanese Notice of Allowance dated Sep. 1, 2015 in connection with the counterpart Japanese Patent Application No. 2014-506345, citing the above reference(s).

(Continued)

*Primary Examiner* — Mary F Theisen
(74) *Attorney, Agent, or Firm* — Hauptman Ham, LLP

(57) ABSTRACT

The present invention relates to a glass fiberboard and to a production method therefor, and more specifically, to technology for providing a glass fiberboard for vacuum heat insulation and a production method therefor, which have outstanding initial heat insulation performance and economic advantages through application of an optimized inorganic binder.

4 Claims, 3 Drawing Sheets

(56) References Cited

FOREIGN PATENT DOCUMENTS

| JP | 05279105 A | 10/1993 |
|----|------------|---------|
| JP | 10115396 A | 5/1998 |
| JP | 2006198467 A | 8/2006 |
| JP | 2010163369 A | 7/2010 |
| WO | 2005024107 A2 | 3/2005 |
| WO | 2011048976 A1 | 4/2011 |

OTHER PUBLICATIONS

Taiwanese Office Action dated Nov. 21, 2013, citing the above reference(s).

The Reaction of Aluminum Sulfate with Sodium Hydroxide, Mar. 7, 2011 and retrieved on Dec. 18, 2014, 5 pages, Ebeesley.

Japanese Office Action dated Dec. 2, 2014, citing the above reference(s).

European Search Reports dated Feb. 9, 2015, citing the above reference(s).

Chinese Office Action dated Apr. 27, 2015, citing the above reference(s).

International Search Report for PCT/KR2012/003699 mailed Nov. 26, 2012, citing the above reference(s).

Taiwanese Office Action dated Jul. 24, 2014, citing the above reference(s).

\* cited by examiner

GLASS FIBERBOARD AND PRODUCTION METHOD THEREFOR

CROSS REFERENCE TO RELATED APPLICATION

This application claims the priority of Korean Patent Application No. 10-2011-0044629, filed on May 12, 2011 in the Korean Patent and Trade Mark Office. Further, this application is the National Phase application of International Application No. PCT/KR2012/003699 filed on May 11, 2012, which is incorporated herein by reference in its entirety.

TECHNICAL FIELD

The present invention relates to glass fiberboards and a production method therefor, and more particularly, to a technology for providing a glass fiberboard for vacuum heat insulation, which has outstanding initial heat insulation performance and economic advantages through application of an optimized inorganic binder, and a production method therefor.

BACKGROUND ART

Glass fiberboards for vacuum heat insulation have excellent long-term durability of 15 years or more and excellent initial thermal conductivity of 3.0 mW/mk or less at a size of 600×600 mm Generally, glass fiberboards are produced by mixing micro-glass fibers and general glass fibers in a ratio of 6:4 to 9:1, stirring in a solution of pH 2~4, and drying the mixture in the form of a board. Upon stirring, the micro-glass fibers are twisted, thereby facilitating production of the glass fiberboard while providing excellent heat insulation performance.

On the other hand, micro-glass fibers having a diameter of 1~3 μm are produced by a flame process, which cause environmental pollution and often suffers poor quality causing significant increase in manufacturing costs. Due to such disadvantages, the production of micro-glass fibers is only allowed in some countries, and regulations concerning treatment of glass fibers having a diameter of 4 μm or less are enforced in Europe due to concerns regarding human heath.

Therefore, there is a need for development of a core material for vacuum heat insulation with standardized glass fibers having a diameter of 4 μm or more.

To produce a board using standardized glass fibers, a binder is used. Glass fibers having a diameter of 4 μm or more have a linear shape and thus do not entail a twisting phenomenon unlike micro-glass fibers.

In use of a general inorganic binder, movement of moisture causes the binder to move in the course of drying, whereby only the surface can be cured, thereby causing deterioration in heat insulation performance.

Therefore, there is a need for the provision of a glass fiberboard through application of an optimized inorganic binder to standardized glass fibers such that the binder and the glass fibers can be uniformly distributed even after drying.

DISCLOSURE

Technical Problem

It is an aspect of the present invention to provide a glass fiberboard for vacuum heat insulation, in which an inorganic binder and glass fibers are uniformly distributed even after drying through application of an optimized inorganic binder to standardized glass fibers so as to provide excellent initial heat insulation performance and economic advantages, and a production method therefor.

Technical Solution

In accordance with one aspect of the invention, a glass fiberboard includes glass fibers and an inorganic binder, wherein the inorganic binder includes an aluminum compound prepared by neutralization of an aluminum-containing acidic solution and a basic solution.

In accordance with another aspect of the invention, a method for producing a glass fiberboard includes: preparing a mixture solution by stirring glass fibers and an inorganic binder solution; obtaining an extract by removing water from the mixture solution; and compressing and drying the extract.

In accordance with a further aspect of the invention, a method for producing a glass fiberboard includes: preparing glass fibers; depositing an inorganic binder solution to the glass fibers; and compressing and drying the glass fibers deposited with the inorganic binder solution.

Advantageous Effects

The glass fiberboard according to embodiments of the invention employs standardized glass fibers, thereby providing excellent productivity and economic advantages without generating environmental pollution.

In addition, the glass fiberboards according to the embodiments employ an optimized inorganic binder to allow the glass fibers and the binder to be uniformly distributed in the board, thereby providing excellent heat insulation performance.

BEST MODE

Figure 1:
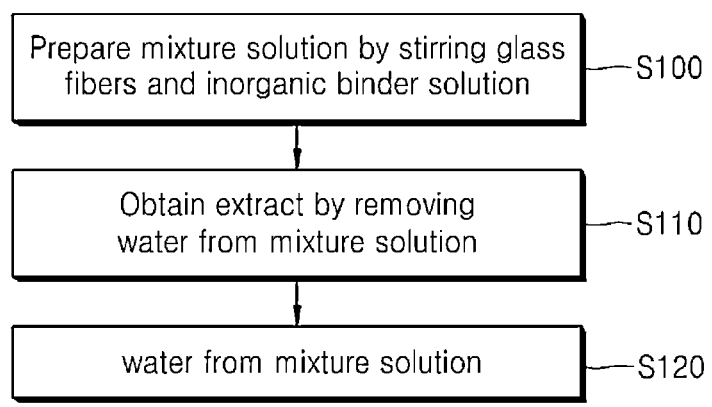
FIG. 1 is a flowchart of a method for producing a glass fiberboard according to one embodiment of the present invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the invention by those skilled in the art. The scope of the present invention is defined only by the claims. Like components will be denoted by like reference numerals throughout the specification.

Now, exemplary embodiments of the invention will be described in detail with reference to the accompanying drawings.

Glass Fiberboard

According to the invention, a glass fiberboard includes glass fibers and an inorganic binder, wherein the inorganic binder includes an aluminum compound prepared by neutralization of an aluminum-containing acidic solution and a basic solution.

Here, although any glass fibers may be used without limitation so long as the glass fibers can be used as core materials for vacuum thermal insulation, standardized glass fibers, which can be easily produced without causing environmental pollution are advantageously used. More specifically, glass fibers having a diameter of 6 μm or less are used in term of easy production.

The inorganic binder includes an aluminum compound, which is prepared through neutralization of an aluminum-containing acidic solution and a basic solution.

Here, the aluminum-containing acidic solution may be aluminum sulfate, and the basic solution may be sodium hydroxide.

The basic solution generates an aluminum compound (salt) through reaction with the aluminum-containing acidic solution, and the aluminum compound (salt) serves as a binder for the glass fibers.

That is, in the present invention, the aluminum compound produced through neutralization of the basic solution and the aluminum-containing acidic solution is used as the inorganic binder. Here, the aluminum compound (salt) may be aluminum hydroxide.

When the aluminum-containing acidic solution is aluminum sulfate and the basic solution is sodium hydroxide, the aluminum compound (salt) may be produced according to the following reaction formula.

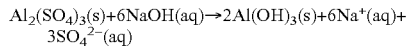

$$Al_2(SO_4)_3(s)+6NaOH(aq)\rightarrow 2Al(OH)_3(s)+6Na^+(aq)+3SO_4^{2-}(aq)$$

The aluminum compound (salt) produced by neutralization is not displaced by movement of water in the course of drying, and can be uniformly distributed between the glass fibers, thereby providing excellent performance as a binder.

A dried product of the aluminum compound (salt) is aluminum oxide and is produced according to the following reaction formula.

$$2Al(OH)_3(s)\rightarrow Al_2O_3(s)+3H_2O(g)$$

Aluminum oxide produced as the dried product serves as a binder which allows standardized glass fibers having a diameter of 4~6 μm to be efficiently agglomerated while being uniformly distributed between the glass fibers.

Method for Producing Glass Fiberboard

As shown in FIG. 1, a method of producing a glass fiberboard according to one embodiment includes preparing a mixture solution by stirring glass fibers and an inorganic binder solution (S100); obtaining an extract by removing water from the mixture solution (S110); and compressing and drying the extract (S120).

First, the mixture solution is prepared by stirring the glass fibers and the inorganic binder solution (S100).

Although any glass fibers may be used without limitation so long as the glass fibers can be used as core materials for vacuum thermal insulation, standardized glass fibers, which can be easily produced without generating environmental pollution are advantageously used. Advantageously, glass fibers having a diameter of 6 μm or less are used in term of easy production.

The inorganic binder solution is prepared by mixing the inorganic binder with water. The inorganic binder is described above and a description thereof will not be repeated.

The inorganic binder may be present in an amount of 0.1% by weight (wt %) to 1 wt % based on the total weight of the inorganic binder solution. When the amount of the inorganic binder is less than 0.1 wt %, there can be a problem of undesirable board strength, and when the amount of the inorganic binder exceeds 1 wt %, the inorganic binder can cause increase in thermal conductivity.

The glass fibers may be present in an amount of 0.5 wt % to 1 wt % based on the total weight of the mixture solution. This content of the glass fibers is set to secure uniform dispersion of the glass fibers during stirring.

There is no restriction as to the stirring rate, and the mixture solution is prepared by sufficiently stirring the glass fibers and the inorganic binder to be uniformly mixed with each other.

Then, an extract is prepared by removing water from the mixture solution (S110).

To remove water from the mixture solution, a sieve is used. When the mixture solution is passed through the sieve, water passes through the sieve, and only the extract, which is the mixture of the glass fibers and the binder, remains in the sieve.

Then, the extract is subjected to vacuum suctioning to remove the remaining moisture from the extract to reduce drying time.

Next, the extract is subjected to compression and drying, thereby providing a completed glass fiberboard (S120).

Here, compression of the extract may be carried out at a pressure of 2.0 kg/cm² to 2.4 kg/cm², and drying may be carried out at a temperature of 250° C. to 300° C. for 10~5 minutes.

If the compression pressure is less than 2.0 kg/cm², the glass fibers can be arranged not to be perpendicular to a thickness direction, and if the compression pressure exceeds 2.4 kg/cm², the physical properties of the glass fibers can be degraded due to excessive compression.

If the drying temperature is less than 250° C., the glass fibers can be insufficiently dried, and if the drying temperature exceeds 300° C., the physical properties of the glass fibers can be degraded.

If the drying time is less than 10 minutes, the glass fibers can be insufficiently dried, and if the drying time exceeds 15 minutes, there is a problem of deterioration in drying effects as compared with the drying time since the extract can be excessively dried in the course of drying.

Figure 2:
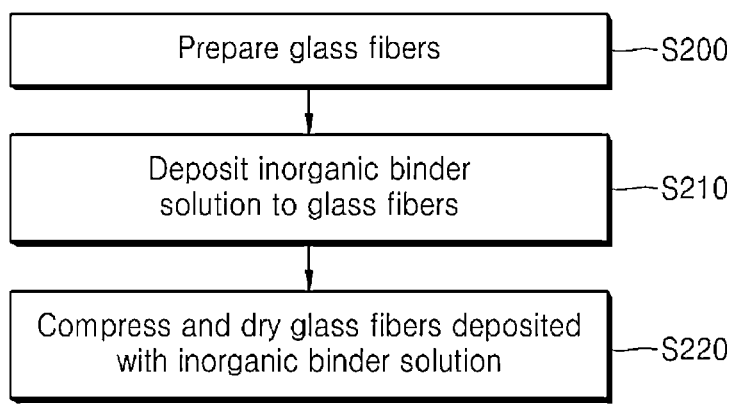
FIG. 2 is a flowchart of a method for producing a glass fiberboard according to another embodiment of the present invention.

Referring to FIG. 2, a method of producing a glass fiberboard according to another embodiment of the invention includes: preparing glass fibers (S200); depositing an inorganic binder solution to the glass fibers (S210); and compressing and drying the glass fibers deposited with the inorganic binder solution (S220).

In the operation of depositing the inorganic binder solution in the prepared glass fibers (S210), deposition of the inorganic binder solution may be advantageously performed by mixing the aluminum-containing acidic solution with the basic solution and spraying the mixture, without being limited thereto.

Other operations of this method according to this embodiment are the same as those of the production method according to the above embodiment, and a detailed description thereof will thus be omitted.

Next, the present invention will be described in detail with reference to some specific examples.

EXAMPLE AND COMPARATIVE EXAMPLE

Production of Glass Fiberboard

Example 1

Prepared glass fibers are obtained by mixing glass fibers having a diameter of 4 μm and glass fibers having a diameter of 6 μm in a ratio of 7:3. Then, 3 g of a sodium hydroxide and aluminum sulfate mixture was added to 1 L of water to prepare a binder solution. The prepared glass fibers were added to the binder solution to be present in an amount of 1 wt % based on the total weight of the binder solution, followed by stirring at 300 rpm using a stirrer. The mixture was passed through a sieve to remove water from the mixture to produce an extract, which in turn was subjected to vacuum suctioning and compression at a pressure of 2.0 kg/cm$^2$ for 30 seconds. Then, the compressed extract was dried at 250° C. for 10 minutes, thereby producing a glass fiberboard.

Example 2

A glass fiberboard was produced in the same manner as in Example 1 except that a binder solution was prepared by adding 1.5 g of a sodium hydroxide and aluminum sulfate mixture to 1 L of water.

Example 3

A glass fiberboard was produced in the same manner as in Example 1 except that a binder solution was prepared by adding 5 g of a sodium hydroxide and aluminum sulfate mixture to 1 L of water.

Example 4

A glass fiberboard was produced in the same manner as in Example 1 except that a binder solution was prepared by adding 10 g of a sodium hydroxide and aluminum sulfate mixture to 1 L of water

Example 5

A glass fiberboard was produced in the same manner as in Example 1 except that a binder solution was prepared by adding 20 g of a sodium hydroxide and aluminum sulfate mixture to 1 L of water.

Comparative Example 1

A glass fiberboard was produced in the same manner as in Example 1 except that the sodium hydroxide and aluminum sulfate mixture was not used.

Comparative Example 2

A glass fiberboard was produced by a typical method using a common silica sol as the binder.

Comparative Example 3

A mixture obtained by mixing a resol type phenolic resin and a urea resin in a mass ratio of 80:20 was dissolved in water to prepare a resin solution (solid content: 40%). 100 parts by weight of the resin solution, 3 parts by weight of an aqueous silica sol, 2 parts by weight of ammonium sulfate, and 2 parts by weight of heavy oil emulsion in terms of solid content were mixed and adjusted to a pH of 8.0 with 25% ammonia solution, followed by diluting the mixture with water to achieve a solid content of 18%, thereby preparing an aqueous binder for inorganic fibers. Other processes were carried out in the same manner as in Example 1 to produce a glass fiberboard.

Evaluation

1. Initial Thermal Conductivity (1) Thermal Conductivity According to the Content of Sodium Hydroxide and Aluminum Sulfate The initial heat conductivities of the glass fiberboards prepared in Examples 1 to 5 and Comparative Example 1 were measured.

Figure 3:
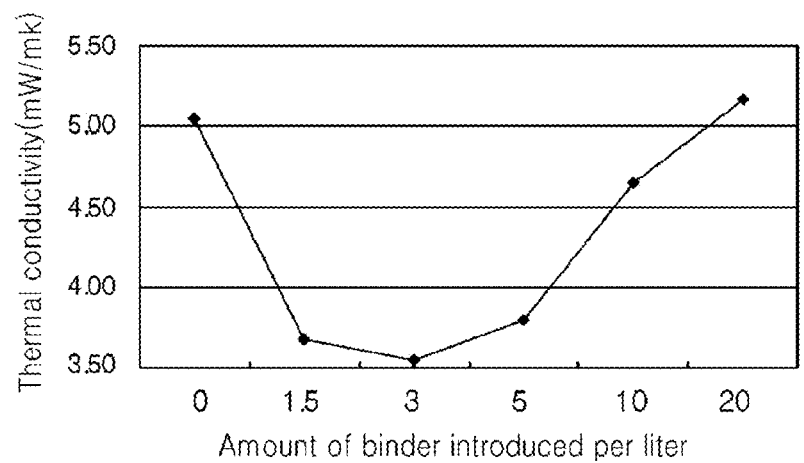
FIG. 3 is a graph depicting initial thermal conductivity of glass fiberboards prepared in inventive examples and comparative examples.

Measurement results are shown in FIG. 3. From this, it can be seen that the glass fiberboards exhibited desirable initial thermal conductivity when 1.5~5 g of the sodium hydroxide and aluminum sulfate mixture was added. In particular, the glass fiberboard prepared in Example 1 had the lowest initial thermal conductivity, thereby providing excellent heat insulation performance.

(2) Thermal Conductivity in Comparative Examples 2 and 3

The initial heat conductivities of the glass fiberboards prepared in Comparative Examples 2 and 3 were measured.

Measurement results are shown in Table 1.

TABLE 1

|  | Thermal conductivity |
|---|---|
| Comparative Example 2 | 5.24 mW/mK |
| Comparative Example 3 | 4.97 mW/mK |

2. EDS Analysis

Through composition analysis of the glass fiberboards prepared in Examples 3 and 4 and Comparative Example 1, the binder content of the glass fibers was obtained. For this purpose, composition analysis was performed on two points of each prepared glass fiberboard specimen, and the binder content was obtained based on an average thereof. Results are shown in Table 2.

TABLE 2

| Element | Comparative Example 1(%) | Example 3(%) | Example 4(%) |
|---|---|---|---|
| O | 47.46 | 50.72 | 51.98 |
| Na | 9.62 | 8.82 | 10.02 |
| Mg | 1.16 | 1.16 | 1.16 |
| Al | 1.92 | 2.69 | 3.47 |
| Si | 31.36 | 30.62 | 27.88 |
| Ca | 8.49 | 5.99 | 5.48 |
| Binder content | 0 | 1.47 | 2.94 |

3. Verification of Binder Through SEM Analysis

SEM analysis was performed to ascertain uniform distribution of the binder in the glass fibers.

Figure 4:
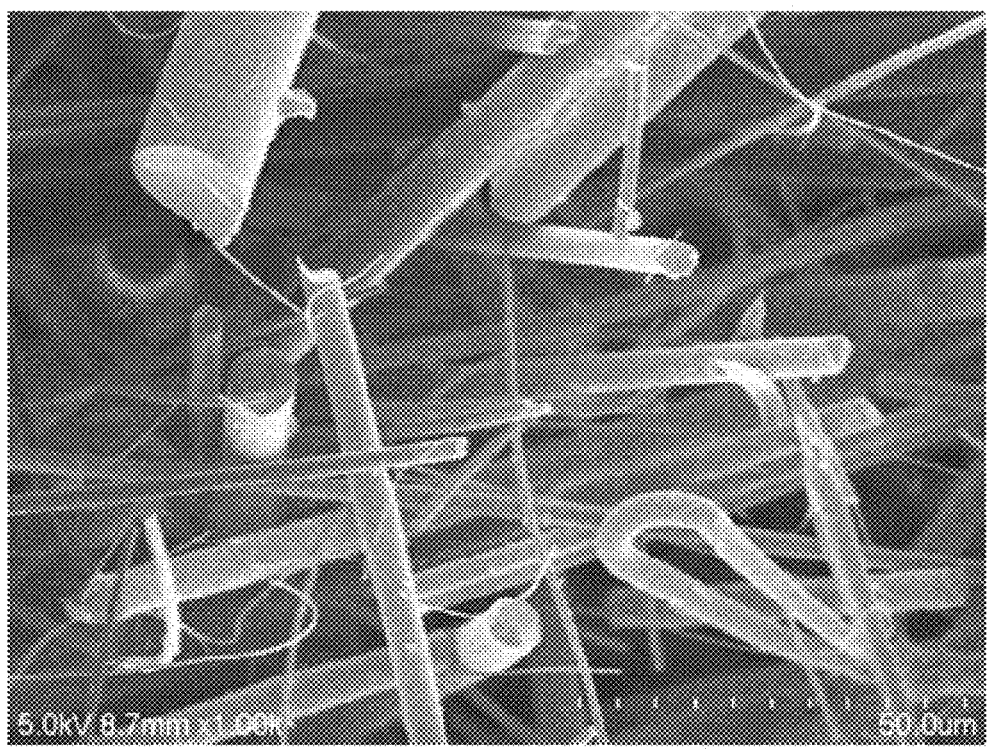
FIG. 4 is a scanning electron micrograph (SEM) of a glass fiberboard prepared in a comparative example.
Figure 5:
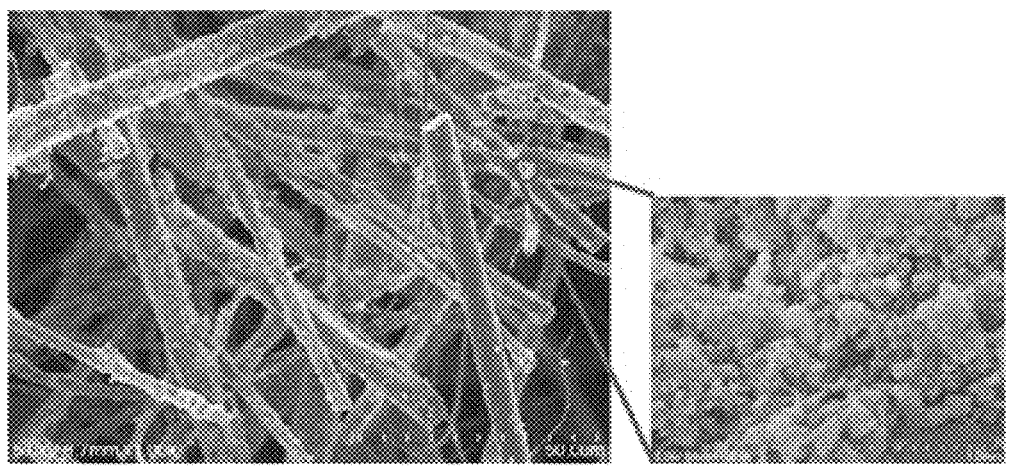
FIG. 5(a) is an SEM micrograph of a glass fiberboard prepared in one example.
FIG. 5(b) is a partially enlarged view.

FIG. 4 shows a scanning electronic micrograph (SEM) of the glass fiberboard prepared in Comparative Example 1, and FIG. 5 shows an SEM micrograph of the glass fiberboard prepared in Example 1.

From FIG. 4 and FIG. 5, it can be ascertained that the glass fiberboards of the inventive example include uniformly distributed aluminum oxide on surfaces of the glass fibers.

Although some embodiments have been described herein, it will be understood by those skilled in the art that various modifications, changes, alterations and equivalent embodiments can be made without departing from the scope of the present invention. Therefore, the scope of the present invention is not limited by the above embodiments and should be defined by the accompanying claims and equivalents thereof.

Although the present invention has been described with reference to some embodiments and the accompanying drawings, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A method for producing a glass fiberboard, comprising:
preparing a mixture solution by stirring glass fibers and an inorganic binder solution;
obtaining an extract by removing water from the mixture solution; and
compressing and drying the extract,
wherein the inorganic binder solution comprises a mixture of aluminum sulfate and sodium hydroxide,
the inorganic binder is present in an amount of 0.1 wt % to 1 wt % based on the total weight of the inorganic binder solution, and
the glass fibers having a diameter of 4 μm-6 μm.

2. The method for producing a glass fiberboard according to claim 1, wherein the mixture solution comprises an aluminum compound.

3. The method for producing a glass fiberboard according to claim 2, wherein the aluminum compound is aluminum hydroxide.

4. The method for producing a glass fiberboard according to claim 2, wherein a dried product of the aluminum compound is aluminum oxide.

* * * * *